(12) United States Patent
Aemisegger et al.

(10) Patent No.: US 8,479,643 B2
(45) Date of Patent: Jul. 9, 2013

(54) WATER CIRCULATION SYSTEM FOR A BEVERAGE PREPARATION DEVICE

(75) Inventors: Steve Aemisegger, Neuchâtel (CH); Thomas Hodel, Hagendorn (CH); Markus Lang, Wabern (CH); Peter Möri, Walperswil (CH); Renzo Moser, Gümmenen (CH); Rudolf Schenk, Konolfingen (CH)

(73) Assignee: Nestec S.A., Vevey (CH)

( * ) Notice: Subject to any disclaimer, the term of this patent is extended or adjusted under 35 U.S.C. 154(b) by 217 days.

(21) Appl. No.: 13/002,979

(22) PCT Filed: Jul. 7, 2009

(86) PCT No.: PCT/EP2009/058562
§ 371 (c)(1),
(2), (4) Date: Jan. 6, 2011

(87) PCT Pub. No.: WO2010/006953
PCT Pub. Date: Jan. 21, 2010

(65) Prior Publication Data
US 2011/0113971 A1 May 19, 2011

(30) Foreign Application Priority Data
Jul. 14, 2008 (EP) .................................... 08160340

(51) Int. Cl.
*A47J 31/41* (2006.01)
(52) U.S. Cl.
USPC .............. 99/302 R; 99/280; 99/300; 99/307; 99/302 P; 99/281; 250/577

(58) Field of Classification Search
USPC ................................ 99/300, 302 R, 303, 307
See application file for complete search history.

(56) References Cited

U.S. PATENT DOCUMENTS 4,143,589 A * 3/1979 Weber ............................ 99/282
4,745,293 A * 5/1988 Christensen ................... 250/577
4,829,888 A * 5/1989 Webster et al. ................. 99/284
(Continued)

FOREIGN PATENT DOCUMENTS
AU 1654976 2/1978
DE 8411684 9/1984
(Continued)

OTHER PUBLICATIONS
International Search Report, PCT/EP2009/058562, mailed Dec. 10, 2009.

*Primary Examiner* — Joseph M Pelham
*Assistant Examiner* — Jimmy Chou
(74) *Attorney, Agent, or Firm* — Winston & Strawn LLP

(57) ABSTRACT

The present invention relates to a beverage preparation device having a water circulation system that includes a water source with an outlet, a pump with a support member for holding and securing the pump in the device, and an integral water conduit having an inlet and outlet for guiding water from the water source to the pump. The conduit outlet is connected to the pump and the water source outlet is connected to the water conduit inlet via an annular sealing member that forms an integral protruding portion of one of the conduit inlet or the source outlet. The pump support is integral with the water conduit, in particular with the conduit outlet.

19 Claims, 6 Drawing Sheets

U.S. PATENT DOCUMENTS

| | | | | |
|---|---|---|---|---|
| 5,060,558 | A * | 10/1991 | Beumer et al. | 99/306 |
| 5,189,949 | A * | 3/1993 | Apa | 99/453 |
| 5,907,993 | A * | 6/1999 | Van Camp et al. | 99/280 |
| 5,943,472 | A * | 8/1999 | Charles et al. | 392/396 |
| 5,957,033 | A * | 9/1999 | In-Albon | 99/284 |
| 5,992,298 | A * | 11/1999 | Illy et al. | 99/281 |
| 6,405,637 | B1 * | 6/2002 | Cai | 99/293 |
| 6,622,615 | B2 * | 9/2003 | Heczko | 99/323.3 |
| 6,763,759 | B2 * | 7/2004 | Denisart | 99/302 P |
| 6,990,891 | B2 * | 1/2006 | Tebo, Jr. | 99/295 |
| 7,051,648 | B2 * | 5/2006 | Fenaroli | 99/321 |
| 7,087,840 | B2 * | 8/2006 | Herring et al. | 174/101 |
| 7,093,533 | B2 * | 8/2006 | Tebo et al. | 99/315 |
| 7,347,137 | B2 * | 3/2008 | Lafond et al. | 99/281 |
| 7,461,585 | B2 * | 12/2008 | Nenov et al. | 99/282 |
| 7,543,526 | B1 * | 6/2009 | Tai | 99/284 |
| 7,617,763 | B2 * | 11/2009 | Chen et al. | 99/302 R |
| 7,640,845 | B2 * | 1/2010 | Woodnorth et al. | 99/300 |
| 7,784,396 | B2 * | 8/2010 | Fai et al. | 99/295 |
| 7,798,054 | B2 * | 9/2010 | Evers et al. | 99/295 |
| 7,861,644 | B2 * | 1/2011 | Ghassemlou et al. | 99/281 |
| 8,011,291 | B2 * | 9/2011 | Morin et al. | 99/302 R |
| 8,151,694 | B2 * | 4/2012 | Jacobs et al. | 99/302 R |
| 8,225,876 | B2 * | 7/2012 | Mei | 166/380 |
| 2002/0035929 | A1 * | 3/2002 | Kanba et al. | 99/279 |
| 2004/0089371 | A1 * | 5/2004 | Few | 141/98 |
| 2005/0247204 | A1 * | 11/2005 | Lafond et al. | 99/279 |
| 2005/0268790 | A1 * | 12/2005 | Baldacci | 99/285 |
| 2007/0261566 | A1 * | 11/2007 | Varney et al. | 99/300 |
| 2007/0272085 | A1 * | 11/2007 | Ghassemlou et al. | 99/282 |
| 2008/0184896 | A1 * | 8/2008 | Brouwer | 99/300 |
| 2008/0187638 | A1 * | 8/2008 | Hansen | 426/433 |
| 2008/0196593 | A1 * | 8/2008 | Shrader et al. | 99/300 |
| 2008/0245238 | A1 * | 10/2008 | Huiberts | 99/300 |
| 2008/0282898 | A1 * | 11/2008 | Knepler | 99/285 |
| 2008/0283131 | A1 * | 11/2008 | Etter et al. | 137/517 |
| 2009/0266239 | A1 * | 10/2009 | Noordhuis | 99/295 |

FOREIGN PATENT DOCUMENTS

| | | |
|---|---|---|
| DE | 3904376 | 8/1990 |
| EP | 0 150 693 A2 | 8/1985 |
| EP | 0 761 150 B1 | 3/1997 |
| EP | 1 055 386 A1 | 11/2000 |
| EP | 1 369 070 A2 | 12/2003 |
| EP | 1 600 086 B1 | 11/2005 |
| FR | 2214069 | 8/1974 |
| FR | 2544185 | 10/1984 |
| FR | 2841116 | 12/2003 |
| WO | WO 2006/032599 A2 | 3/2006 |
| WO | WO 2007/017851 A1 | 2/2007 |

* cited by examiner

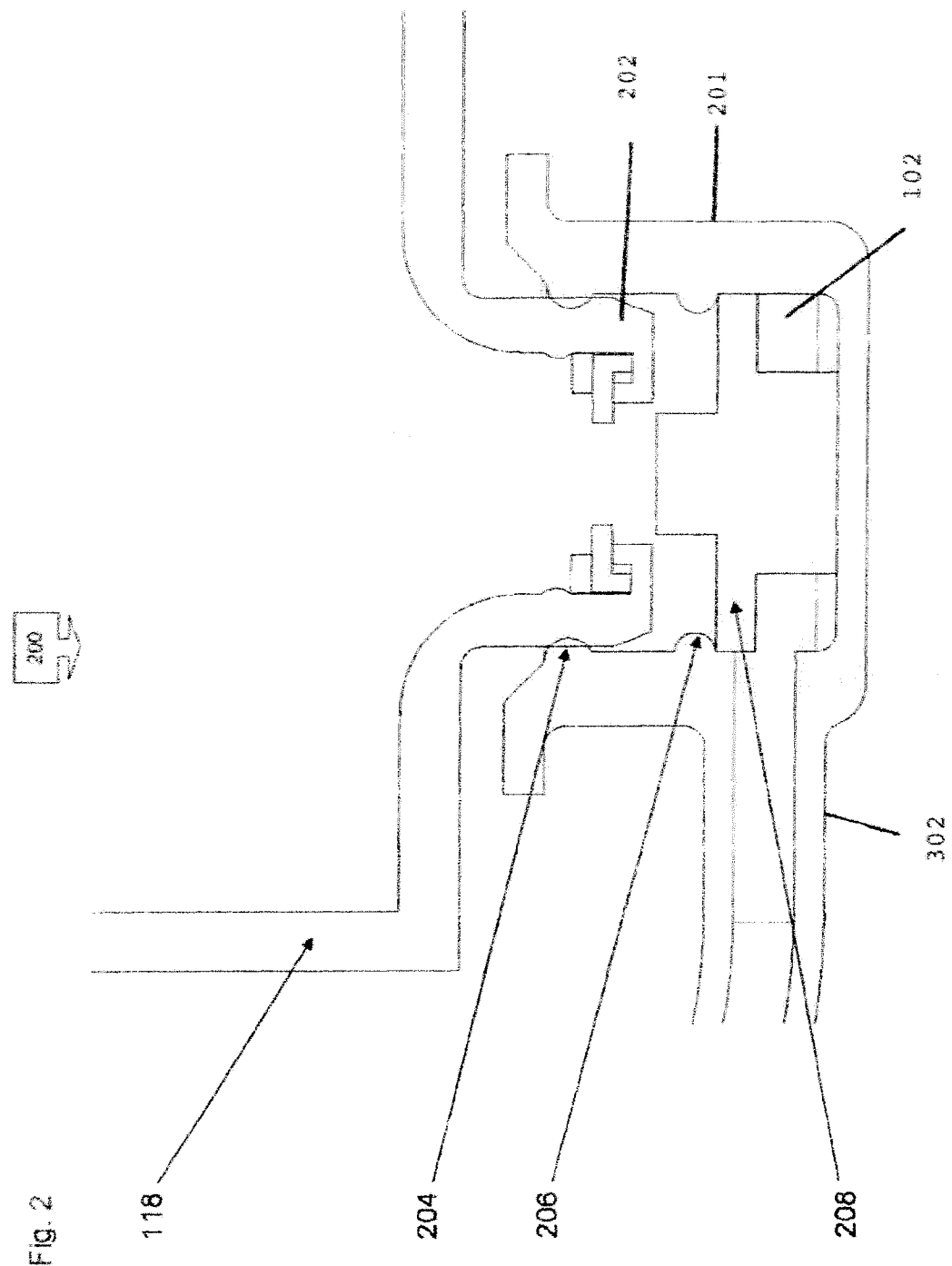

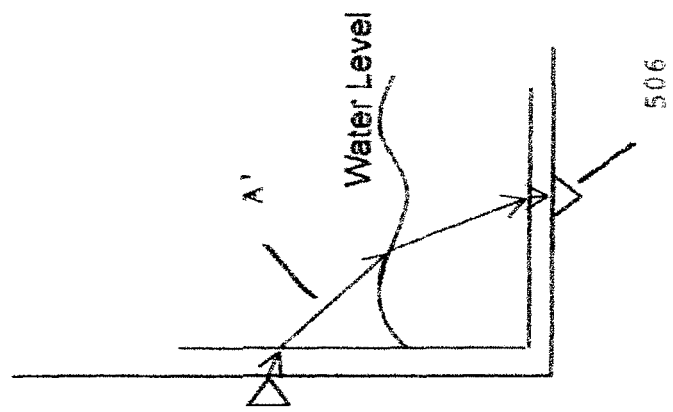
Fig. 5-b
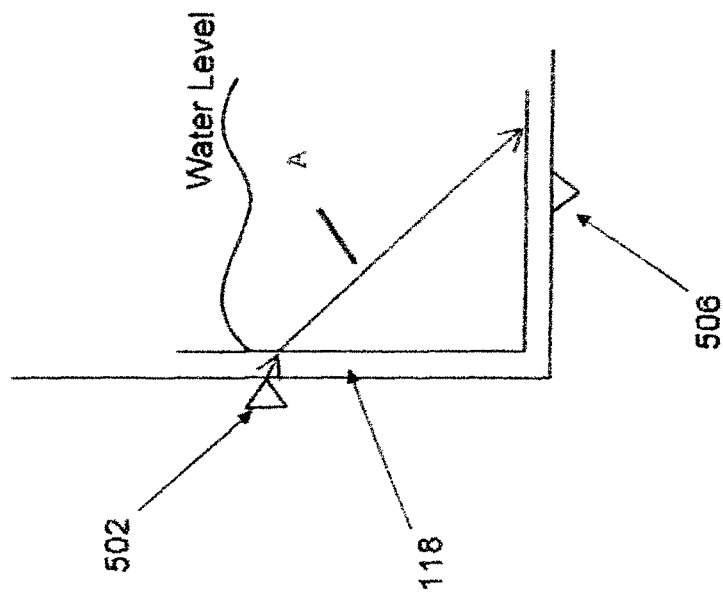
Fig. 5-a

WATER CIRCULATION SYSTEM FOR A BEVERAGE PREPARATION DEVICE

This application is a 371 filing of International Patent Application PCT/EP2009/058562 filed Jul. 7, 2009.

FIELD OF THE INVENTION

The present invention relates to an improved water circulation system for beverage preparation devices, such as coffee machines, and particularly to a beverage production device producing a beverage based on ingredients contained in a capsule to be inserted into the beverage production device. The present invention further relates to such water-based beverage preparation devices that are provided with an integrated water circulation system, as well as to a method of using said integrated water circulation systems. Furthermore, the present invention relates to a method for detecting the water level in a water tank of the water circulation system.

BACKGROUND OF THE INVENTION

Various machines for extracting hot beverages or food from ground coffee, tea, soups and the like are known.

Particularly, U.S. Pat. No. 5,943,472 discloses a water circulation system for such a machine between a water reservoir and a hot water or vapour distribution chamber, for an espresso machine. The circulation system includes valves, a metallic heating tube and a pump that are interconnected with each other and with the reservoir via a plurality of silicone hoses that are joined together by clamping collars.

Such a beverage preparation machine has a complex water circulation system configuration that is bulky and costly, while consisting of a plurality of discrete parts. While the water circulation system might pertain to a compact beverage production device, it is difficult to design and accommodate the large number of parts proposed by the U.S. Pat. No. 5,943,472 in a compact configuration, while at the same time providing for facility of manufacture of such a machine.

Further drawbacks of the system proposed by U.S. Pat. No. 5,943,472 reside in its complexity of fabrication and production, that results in increased costs. Further yet, since the proposed system comprises a large number of stand alone parts, it requires a large number of assembly steps to fabricate and service the device. The assembly of silicon hoses and clamps also require human intervention during assembly of the machine. As a result, the manufacture and service of said devices is very complex and costly.

Therefore, there is a need for a simplified design for the water circulation system of a beverage production device.

OBJECT AND SUMMARY OF THE INVENTION

The present invention permits overcoming these drawbacks.

For this purpose, it provides an improved design for a water circulation system for use in connection with beverage producing devices, such as e.g. a coffee machine.

The present invention further aims at reducing the number of parts, assembly steps and costs of production of the water supply system of a beverage preparation machine. Since the present invention aims at reducing the number of steps required for assembly and the complexity of the assembly process, it further aims at providing for an increased automation of the assembly process of such a beverage preparation device.

One aspect of the invention resides in a more efficient design of the interface between the water holding tank and the machine's water circulation system.

Another aspect of the invention resides in providing an integrated design for the water pump comprised by the water supply system, a solution that aims at decreasing the intricacy of the water system and allowing the automation of the beverage preparation device fabrication.

A further aspect of the invention aims at integrating into one component the electrical circuitry leading to the pump, such as into the connector of the water pipe assembled to the water pump.

A yet further aspect of the invention aims at integrating a water level detector into the water circulation system.

These objects are achieved by means of the features of the independent claims. The dependent claims further develop the concepts of the present invention.

According to a first aspect of the present invention, a beverage preparation device comprises a water source with an outlet, a pump with a support member, and an integral water conduit with an inlet and an outlet for guiding water form the water source to the pump, the conduit outlet being connected to the pump. The water source outlet is connected to the water conduit inlet via an annular sealing member that forms an integral protruding portion of the conduit inlet or the source outlet. The pump support is integral with the water conduit, in particular with the conduit outlet.

The water conduit, in particular the conduit outlet, may incorporate an electrical circuitry connected to the pump. The conduit outlet, and/or when present the electrical circuitry, can be connected to the pump by a snap fit connector.

The water source may be or may comprise a water tank, in particular a tank for containing water having a level in the tank that can be measured via an optical water level detector.

The integral conduit can have an intermediate portion that is connected to a sensor, such as a flow meter, pressure sensor or temperature sensor. This intermediate portion of the conduit may have an intermediate outlet and intermediate inlet for guiding water into and out from the sensor, between the water source and the pump. Thereby, the intermediate outlet and intermediate inlet are preferably an integral part of the conduit. Accordingly, inlet and outlet are for instance joined side-by-side and connected to the sensor.

According to another aspect of the present invention, an upstream water circulation system for the above beverage preparation device has a water source such as a water tank with an outlet and an integral water conduit with an inlet for guiding water from the water source to a pump. The water source outlet is connected to the water conduit inlet via an annular sealing member that forms an integral protruding portion of the conduit inlet or the source outlet.

In such a system, the annular sealing member is an integral part of the water conduit inlet and compressed against the source outlet, or vice versa, to seal the connection between the water conduit and the water source. The annular sealing member can be made of at least one of rubber, silicone and a thermo-plastic material.

According to yet another aspect of the invention, a water circulation system of a beverage preparation device as described above has a pump with a support; and a water conduit with an inlet and an outlet. This conduit has an outlet connected to the pump and is arranged to guide water from a water source to the pump. The water conduit is an integral part of the pump support In one embodiment, the pump support comprises: a pump connector integral with the conduit, in particular with the conduit outlet, for mechanically connecting the pump to the support; and a foot member 307 integral with the pump connector for securing the support in the beverage preparation device. Optionally, the conduit outlet extends through the pump connector to a water inlet of the pump. Typically, the foot member 307 and the pump connector 306 are joined via a plurality of spaced apart stems 308.

According to a further aspect of the invention an upstream water circulation system for a beverage preparation device as described above comprises: a water conduit connected to a pump for guiding water from a water source to the pump, the water conduit incorporating an electrical circuitry connected to the pump.

The conduits outlet may be assembled to connectors of the electrical circuitry so that the pump may be assembled to the fluid circuit and the electrical circuit in a single manufacturing operation of the beverage preparation device.

Conveniently, the conduit outlet and/or the electrical circuitry can be connected to the pump by a snap fit connector.

According to a further yet aspect of the invention, a water source for a beverage preparation device as described above, comprises: a tank for containing water and for supplying water to a pump of said device; and an optical sensor for measuring the water level in the tank. The optical sensor comprises a light emitter for emitting to the water in the tank a light beam that is deflectable by this water as a function of the water level; and a light detector for detecting the emitted light beam upon deflection. The light emitter and light detector are so arranged that the emitted light beam is deflectable onto the detector when this water level reaches a predetermined lower value in the tank.

This lower water level may typically correspond to the minimum amount of water for preparing a further cup of beverage. Hence, the beverage preparation device may be arranged so that it does not start a new beverage dispensing cycle once it has detected that the amount of water in the tank is insufficient to complete such a cycle. For this purpose, the beverage preparation device may include an interface that invites the user to refill the water tank so that further cups of beverage may be prepared.

The light detector can be located at a bottom part of the water tank. The light emitter and detector are arranged so that the emitted light undergoes a succession of reflections and refractions, and so that the detector receives a portion of the reflected light when the water level in the water tank reaches the predetermined lower value. It is of course also possible to design the light emitter-detector system in such a manner that the detector receives a portion of the reflected light beam as long as the water level is higher than the predetermined lower value.

Embodiments of the present invention are also directed to apparatuses for carrying out the disclosed methods and including apparatus parts for performing each described method step. These method steps may be performed by way of hardware components, a computer programmed by way of appropriate software, and by any combination of the two or in any other manner. Furthermore, embodiments according to the invention are also directed to methods by which the described apparatus operates. It includes method steps for carrying out every function of the apparatus.

All of the above-captioned aspects are linked by the common concept that during the course of the water in the beverage preparation machines the complexity of the water system, the need for different levels of pressure to be maintained in the system at the same time, the need for miniaturisation for the beverage producing machines, for lighter and more compact machines while preserving functionality, the need for ease of design and manufacture while improving functionality offered to a user and level of quality for a manufactured beverage, pose a plurality of challenges on the designer of such a machine. The present invention aims at offering solutions to a plurality of said challenges.

By providing an integrated water circulation system, i.e. a system in which various functions are incorporated into a single or a small number of components, such as the function for guiding water from the water source, the sealing function between the water source function and the pump function, as well as the support function for the pump, the electrical connection function for the pump, the incoming and outgoing pipe connected to a sensor, such as a flow meter, the number of parts and assembly operations are significantly reduced, as well as the need for human intervention during assembly, especially when the water conduit is made of a flexible material, such as silicone or rubber or even other contemplated materials, in particular thermoplastic or metal-based materials.

BRIEF DESCRIPTION OF THE DRAWINGS

Further advantages, features and objects of the present invention will become evident for the man skilled in the art when reading the following detailed explanation of the embodiments, considering them in conjunction with the figures of the enclosed drawings, in which:

FIG. 2 illustrates a water conduit connector inlet connected to the water tank outlet in accordance with the invention;

FIGS. 5a and 5b illustrate a sensor for measuring the water level in a water tank by optical means associated with the water tank in accordance with the invention.

DETAILED DESCRIPTION OF EMBODIMENTS

Reference will now be made in detail to various embodiments of the invention, one or more examples of which are illustrated in the figures. Each example is provided by way of explanation of the invention and is not meant as a limitation of the invention. For example, features illustrated or described as part of one embodiment can be used on or in conjunction with other embodiments as to yield yet a further embodiment. It is intended that the present invention includes such modifications and variations.

Within the following description of the drawings, the same reference numbers refer to the same components. Generally, only the differences with respect to the individual embodiments are described.

In a beverage preparation machine water can be provided either from a removable water tank or, wherein the beverage preparation machine is in a connected state to a continuous water supply, water is provided from said continuous water supply. The beverage preparation machine can be provided with a water interface connector adapted to be selectively connected to external water supplying means, which can be either a water tank or a water supply port from a water network. The ingredients provided for the beverage preparation may be for example roast or ground coffee, leaf tea, herbal tea or fruit tea or any other ingredients, such as powder soup, which can be made to interact with the liquid in order to prepare a beverage.

The water is provided to the machine in an essentially unpressurized state.

In general terms, the water circulation system in a beverage preparation device comprises at least a pump, a flow meter, control means, water heating means. A number of additional means can also be provided.

The water circulation system is provided with a flow meter and control means for receiving volume fluid information from the flow meter, and controlling the stop of the pump of the machine. Additional pump and additional water heating means to provide steam to a steam outlet can also be provided.

Figure 1:
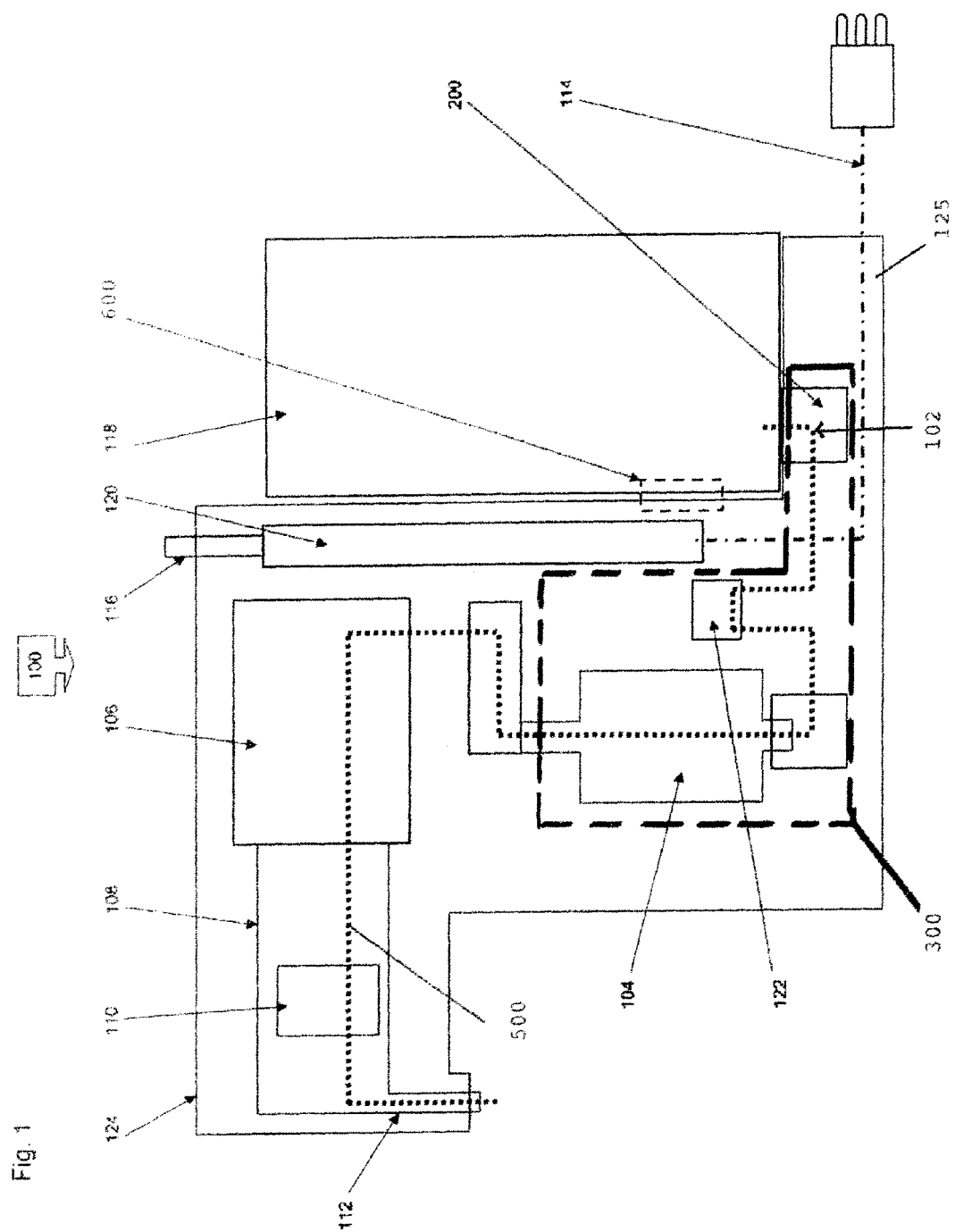
FIG. 1 represents an overall view, in cross section of a beverage preparation device comprising a water circulation system, according to the invention.

Illustrated in FIG. 1 an overall view in cross section of an exemplary beverage preparation device comprising the water circulation system 500, according to the present invention; FIG. 1 permits at the same time visualization of the operation of the water circulation system of said exemplary beverage preparation machine.

The beverage preparation device 100 comprises a water inlet 102, a water pump 104 and water heating means, such as for example a boiler, a thermo-block or a low thermal inertia on-demand heater 106. The heated and pressurized water from the water heating means 106 and the water pump 104 can be supplied to a beverage production unit which e.g. is designed to accommodate an ingredient-containing capsule 110 in an extraction/brewing chamber 108. The term "capsule" means any type of suitable packages containing portioned food ingredients adapted to be inserted in the extraction/brewing chamber such as e.g. a sealed aluminum or plastic capsule and/or a filter pod.

The extraction chamber 108 of the beverage preparation device 100 is designed to inject water into a capsule 110 and to output the thus produced beverage, which is the result of an interaction (extraction, brewing, dissolution, . . . ) of the water with the ingredients and the capsule (not shown), at a beverage outlet 112.

When directly connected to a water supply, the beverage preparation device 100 can produce a beverage by carrying out a set of the basic necessary functions. To this regard the beverage preparation device 100 is also connected to a power supply, through an electric connector 114.

The beverage preparation device 100 is further provided with a user interface 116 comprising for example control buttons, touch screens, etc. The user control interface 116 is functionally connected to an electronic control circuitry 120 that in the beverage preparation device 100 is responsible for controlling at least the operation of the water pump 104 and the water heating means 106, in response to a user manipulating the user control interface 116. In addition, the electronic control circuitry 120 may also control a flow meter 122 with respect to the amount of water provided to the water circuitry system in response to a user manipulation of the user interface 116.

The water inlet port 102 of the beverage preparation device 100 can be connected either to an external water source or to a water tank 118.

In addition to the components illustrated in FIG. 1 the beverage preparation device 100 can also comprise a plurality of other components (not represented in FIG. 1) such as electric control resources, liquid resources, user interface resources (input and information display etc.), and electrical power resources, that for example might offer advanced functionality to a user.

The beverage preparation device 100 is further provided with a flow meter 122 which is in functional connection with the control circuitry 120. Via the flow meter 122 the electronic control circuitry 120 is thus able to monitor the liquid flow from a water tank 118 connected via a inlet port 102 to the rest of the water circulation system of the beverage preparation device 100.

Via the flow meter 122 the electronic control circuitry 120 controls the amount of liquid flowing through the water pump 104 and the heating means 106 and then thus carries out a management of the volume of the beverage or a control of the water temperature according to known beverage preparation techniques, for example, by using temperature sensors in the module.

Figure 3A:
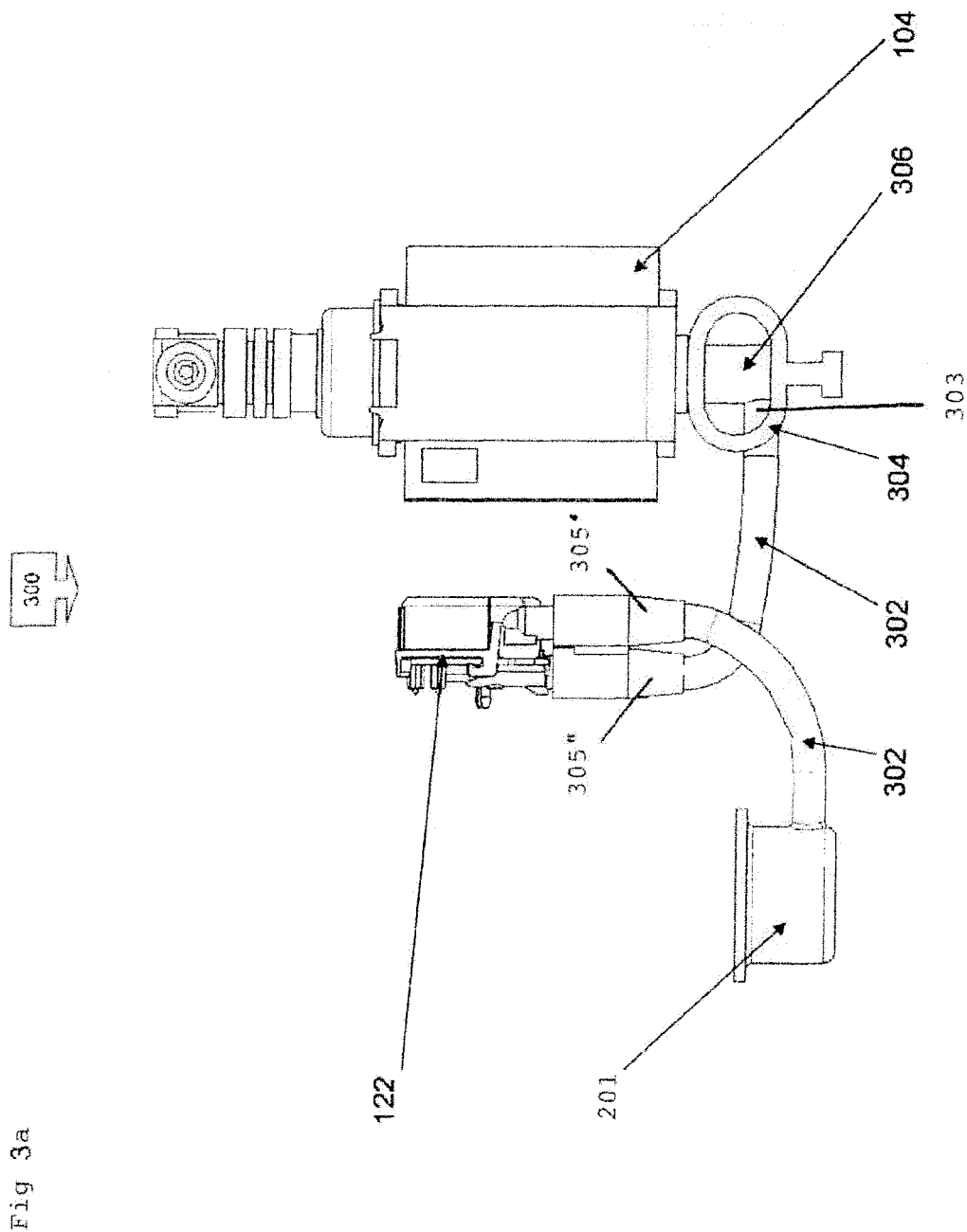
FIGS. 3a and 3b show the integrated water circulation system in accordance with an the present invention.
Figure 3:
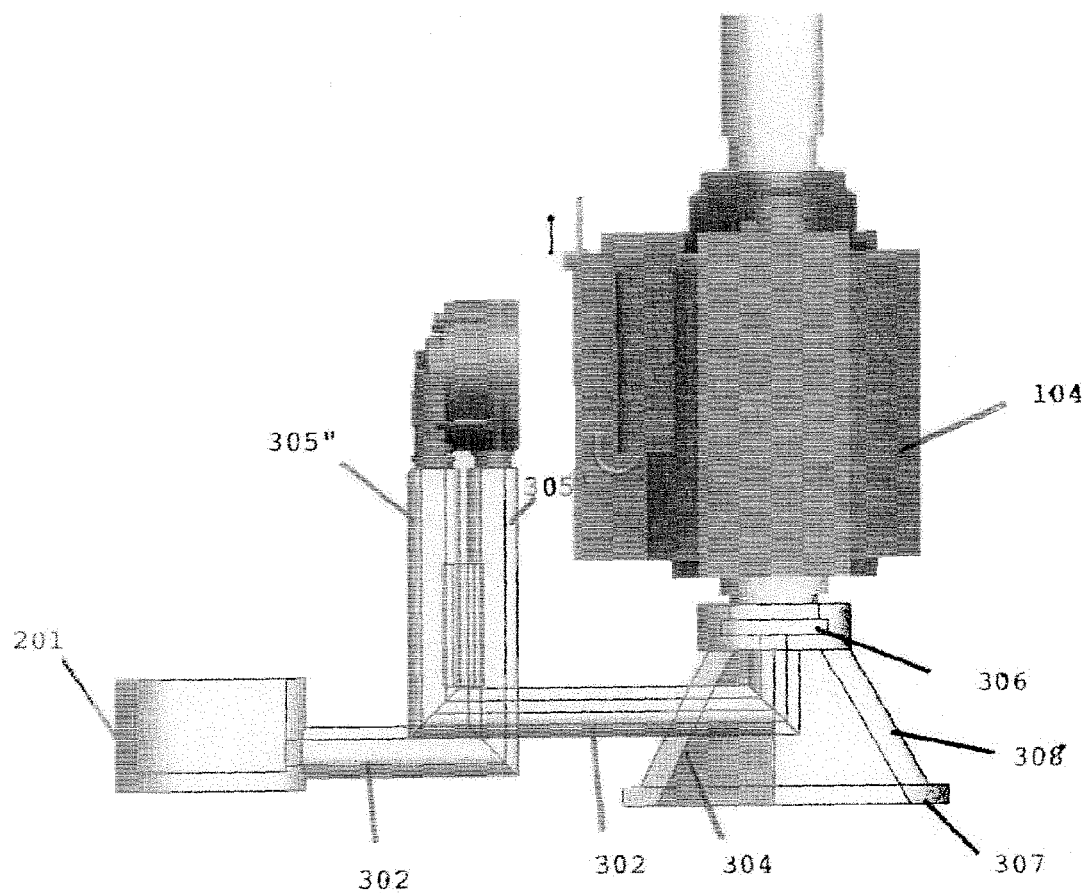

Flow meter 122 can be disposed in an exemplary embodiment of the present invention downstream from the water tank 118, but prior to the water inlet into the pump connector 306 (see FIG. 3).

Furthermore, beverage production device 100 is fitted with electric circuitry connecting the various elements of the device, circuitry that is not illustrated in FIG. 1. The plurality of elements discussed above for the water circulation system are integrated into a machine housing 124 of the beverage production device 100.

Moreover, a closer attention will be given to areas designated in FIG. 1 as 200, the area of interface between a water tank 118 with the rest of the water circuitry system 500 of the beverage production device 100, area 300 of the water circuitry system of the beverage preparation device 100, and area designated 600 of a water tank 118, that will be each described and expanded upon in connection with exemplary embodiments of the present invention.

In connection with each area, solutions according with the present invention will be highlighted, and it will be shown that due to these solutions several component parts present in a classical water circulation system of a beverage preparation machine can be eliminated without compromising the beverage preparation device's operation and quality of the resulting beverage, but leading to economies of parts, simpler structure, ease of fabrication and economy of cost for the water circulation system of the beverage preparation machine.

FIG. 2 illustrates area 200 which relates to the area of interface between a water tank 118 with the rest of the water circuitry system 500, thereby comprising the connector 201 at the input 102 of a water conduit 302 for receiving the water tank outlet 202, implemented in accordance with an exemplary embodiment of the present invention.

A reservoir 118 is provided in beverage preparation device 100 in order to supply liquid, such as water, to pump 104 and the heater 106, and hence to the extraction/brewing chamber 108 and the ingredient-containing capsule 110. The reservoir 118 is connected to the beverage preparation device 100 in a detachable manner and has an inlet (not shown) and is connected to a water tank connector 201 that permits liquid insertion in the water circulation system 500 of the beverage preparation device 100. The reservoir 118 is preferably provided with a handhold (not shown) for facilitating its handling, thus a user can handle the reservoir 118 in a convenient way. A water tank connector 201, which is preferably situated at the bottom of the reservoir 118, is arranged for connecting the outlet 202 of reservoir 118 to the water circulation system 500 of device 100.

As illustrated, the outlet 202 of reservoir 118 is provided with a valve, for instance a "ketchup" valve, that permits carrying reservoir 118 from and to connector 201, e.g. for refilling reservoir 118 with water, without loosing water through the outlet 202 of reservoir 118 as long as this outlet is not in place on connector 201.

In accordance with the present invention, a water tank connector 201, as illustrated in FIG. 2, is disposed between the water tank 118 and the beverage preparation device's housing 124. Such a water tank connector 201, should the beverage preparation device be disposed directly connected to a constant water supply, such as a water line, can be disposed between the inlet 102 into the water circulation system 500 of the beverage preparation device and the water supply line.

The water tank connector 201 comprises a water tank connector sealing lip 204, a retaining lip 206 for a filter insert 208, and optionally a filter insert 208. Connector 201, sealing lip 204, retaining lip 206 are preferably an integral part of the inlet 102 of the water conduit 302.

The water tank connector 201 can be manufactured for example by rubber or of thermo-plastic molding material of similar elasticity and thermal properties.

The housing 124 of the beverage preparation device 100, surrounding the water tank connector 201, will provide mechanical stability to the connector.

The sealing lip 204 aids in the sealing necessary 15 between the water tank 118 and the entry to the piping into the water circulation system 500.

The retaining lip 206 aids in the fixation of the filter 208, making any additional fixation stand alone members for the filter unnecessary.

The upper retaining lip 204 of the water tank connector 200 is inserted into the water tank, providing for sealing between the connector 201 and the tank 118. As such, no additional sealing means are necessary to be inserted in said opening.

In general, water provided by means of the water tank 118 is not under pressure. However, the water tank connector 201 can be outfitted with more than two sealing lips, as required by the design needs of the water tank and connectors, and by the pressure needs. Hence, in case the connector 201 is provided between a permanent water line and device 100, the needs for additional support and sealing are increased due to higher impact on the entry into the water circulation system. Accordingly, more sealing lips can be provided for additional sealing.

As shown above, the retaining lips 204, 206 of the water tank 118 and of the filter insert 208 make any additional filter fixation means unnecessary. As a result, the number of stand alone parts that are comprised in the water tank connector 201 are decreased. As a direct consequence, the number of parts necessary for the assembly is reduced and this improvement translates at least in increased facility of manufacturing and lower costs for the water tank and therefore for the overall water circulation system of device 100.

When manufacturing the water tank connector 201, the manufacture may require only one step, since the connector's surface includes the annular protrusion (having the effect of a retaining lip) 204 that is compressed against the facing surface of the water tank's outlet 202, to seal off the connection between the tank and the machine's water circulation system 500.

Optionally the filter insert 208 illustrated in FIG. 2 can be included in the piping or the water tank.

FIGS. 3a and 3b illustrate in detail a water circulation system, implemented in accordance with an exemplary embodiment of the present invention. Thereby, FIGS. 3a and 3b illustrates in detail the designated 20 area 300 in FIG. 1, comprising the pump 104 and the interface 122 between the water tank 118 and the pump 104.

Vibratory pumps are an example of pumps that are customarily used in beverage preparation devices such as 100. They are almost always located internally and are one-piece, non-serviceable devices.

Vibratory pumps provide a reliable form of pressure to the brewing head in a low-volume environment. This type of pump is self-priming and can be used to draw water from a non-pressurized water source, as the temperature of the pump body rises quickly.

The pump transfers water from the low pressure system to the high pressure needed in a coffee machine for brewing.

As can be seen in FIG. 3a, a low pressure system makes the link between the water tank connector 201, the flow meter 122 and a low pressure side of the pump 104. The pump support 304 is used to hold and secure the pump in place and damp the vibrations against the housing 124 in the best possible manner.

Both the low pressure system and the pump support 304 are made of rubber. The integration of the pump support 304 and the low pressure tubing 302 for the low pressure system reduces the number of parts and simplifies the 5 assembly and therefore reduces costs.

FIG. 3a illustrates the water tank connector 201 connected to a tubing 302 of the low pressure water circulation system. This tubing connects water tank 118 to pump 104. Downstream from water tank 118, connected to the low pressure tubing 302, a flow meter 122 is provided. Flow meter 122 is connected, at an intermediate portion of tubing 302 inbetween an intermediate tubing outlet 305' and inlet 305" that are integral with tubing 302. In fact, tubing 302, tubing's tank connector 201, intermediate outlet 305' and inlet 305" of tubing 302, pump support 304 and pump connector 306 with the tubing's outlet to pump 104 form a single component, in accordance with the present invention.

The integration of these low-pressure tubing parts 302, connectors 306 and pump support member 304 results in the reduction in the number of stand alone parts of the beverage preparation device 100 and therefore, this leads to the reduction of the overall number of parts. The consequence is the improvement of assembly for the beverage preparation device 100 and a cost reduction.

In addition, since the number of connectors is decreased, a better compression of the system is achieved, by eliminating the weak spots where leaks can occur. By integrating the pump support 304, the space occupied by the pump body is decreased for the same pump performance. The disposition of the flow meter 122 integrated between the water tank connector 201 and the pump 104 is optional. For instance, the flow meter 122 may be provided downstream from the pump 104 before or after an in-line water heater 106.

FIG. 3b shows another preferred embodiment of the pump 104 and the interface 122 between the water tank 118 and the pump 104. Thereby, the pump support 304 comprises a foot member 307. Moreover, said foot member 307 and the pump connector 306 are preferably connected by means of a plurality of spaced apart stems 308. Hence, the pump 104 can effectively be supported by means of the foot member 307 which is preferably connected to the housing 124 of the device 100.

In both embodiments shown in FIGS. 3a and 3b, the conduit tubing 302 is connected to the pump 104 by means of a conduit outlet 303. Preferably, the conduit outlet 303 is formed as an integral part of the conduit tubing 302.

Figures 4A, 4B:
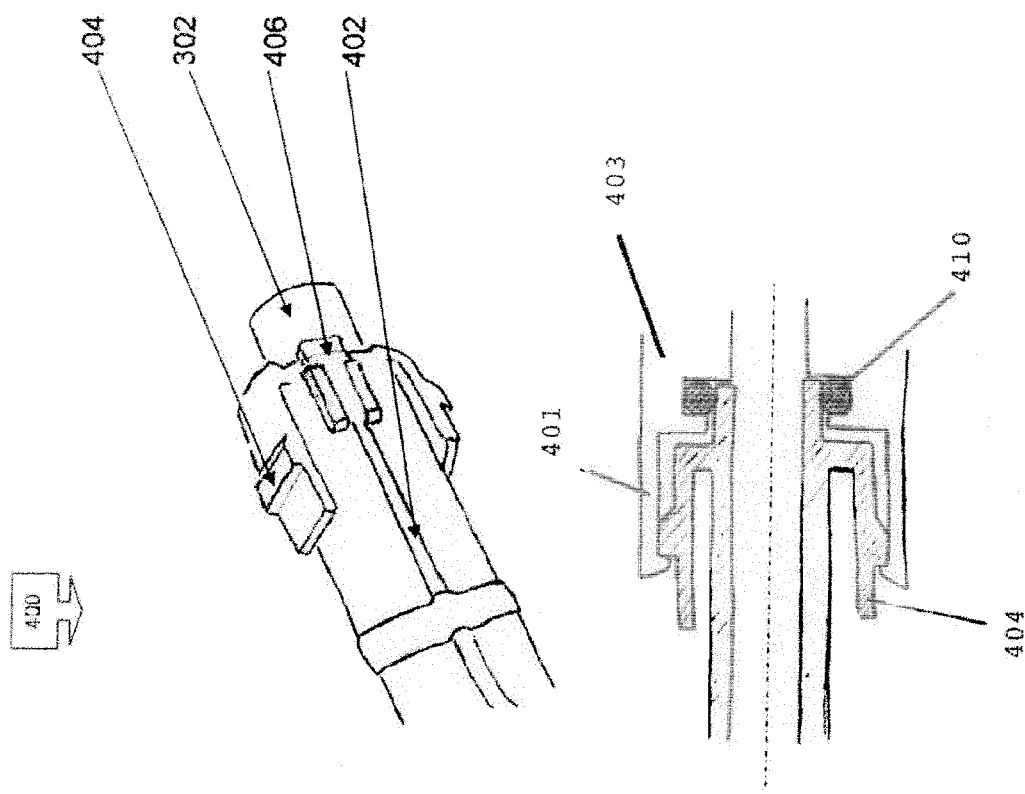
FIGS. 4a and 4b illustrate a hydraulic snap fit tube outlet connector for a water system of a beverage preparation device in accordance the invention.

FIG. 4 illustrates a hydraulic snap fit tube connection 400 for a water system of a beverage preparation device 100 in accordance with the invention. FIG. 4A is a perspective view of said hydraulic snap fit tube connection 400, and FIG. 4B is a cross-sectional view of said hydraulic snap fit tube connection 400.

The tubing connection solution illustrated in FIG. 4 is not restricted to be specifically used only in connection with the low pressure tubing found in the beverage preparation device, but can also be used in connection with other home appliances.

The hydraulic snap fit tube connection 400 solution integrates with the water connection the electrical connection to the pump. On and along the outside of the outlet of the tube 302 extends an electrical wiring 402. The electrical wiring is fitted at least at one of its extremities with an electrical plug 406.

In small spaces, like the ones available in miniaturized beverage preparation machines, it is a challenge to incorporate into the device all tubing necessary without making a compromise on the achieved water pressure and therefore on the quality of the resulting beverage. One solution is to better manage the space available inside the device housing 124. One possible solution is to further integrate the components and one example of such integration is the solution illustrated in FIG. 4, the water conduit 302 assembled with the electrical conduit 402.

A special snap fit connector 404 that incorporates the electrical connection to a pump 104, for example, is provided on the water pipe 302 assembled to the water pump 104. Its purpose is to simplify said connection while preserving good sealing for tightness.

A removable, low cost, snap fit fitting 404 for plastic tubes comprises at least one plastic part 408 and one O-ring 410. Thereby, the O-ring 140 enables effective sealing of the snap fit tube connection 400 and a dedicated counterpart 403. Preferably, an electrical plug can be integrated into the connector counterpart 403 such that an electric connection between the two connectors 400 and 403 is established.

The plastic part 408 shaped as plastic wings permits the fitting of a snap fit ring 401 connected to the counterpart 403 by pressing on the wings to attach or remove. This configuration has the advantage of radial sealing for good leak tightness. It is removed by pressing.

The snap fit fitting 400 has a plurality of advantages at least in the context of its use in the water circuit of a beverage preparation device: its connection is optimized for automatic assembly, it is manufactured as one part made of one or a combination of materials, it is removable therefore makes for removable fittings, and it is locked in snap fit. Moreover, it provides simple and secure connection at very low cost and permits the integration of an electrical connection.

To achieve high integration of the tubing system, the hydraulic snap fit shown in FIG. 4 is integral with the pump support 304 and extends, for instance, through pump connector 306 into pump 104.

FIGS. 5a and 5b illustrate in detail section 600 of FIG. 1 which refers to a solution for measuring the water level in a water tank by optical means integrated with the water tank.

In this embodiment of the present invention it is assumed that the beverage preparation device 100 is supplied with water from a water tank 118 and that said water tank 118 is made of a material light can penetrate, such as glass or transparent plastic, and not of an opaque material, such as dark plastic or metal.

An optical light source 502, such as an LED or an IR diode, is emitting light towards the water tank 118 at a certain pre-determined and conveniently elected angle. An optical detector 506 is placed below the water tank, for example integrated into a base 125 of the beverage preparation machine 100 (see FIG. 1).

When the light beam A emitted towards the tank by the light source 502 hits the tank, the majority of the light beam A is refracted into the wall of the tank. It is previously known, depending on the material used for manufacturing the tank 118, what is the reflective index of the tank material. Upon exit from the water tank the refracted light beam A undergoes a further refraction at the interface between the interior water tank surface and the material found, typically water, if the water level in the tank is sufficient (see FIG. 5a). When the water in the tank 118 reaches a certain level, the detector 506 will sense a refracted light beam (see FIG. 5b).

As shown in FIG. 5a, if sufficient water is remaining in the tank 118 since the light beam A refracted through the water tank is further refracted at the interface between the water tank material and the water and since the water has a smaller refractive index than the material in the tank, the light beam A is deviated at such an angle that it does not reach the detector 506.

As shown in FIG. 5b, if no sufficient water remains in the tank 118, the light beam A' will be detected by the detector 506. The light beam A' is refracted stronger at the exit of the water tank. Further when the beam A enters the water again it is again refracted in the direction of the detector 506. The detector is preferably placed such that the light beam A' falls directly onto the detector.

This method allows the detection whether or not sufficient water is present in the tank 118. It does not allow discrete measurements and the identification of the exact quantity of water in the tank but it offers an important advantage of preventing and protecting the pump 104 since the pump may be damaged if it runs dry.

The detector 506 is electrically and/or logically connected to the user control panel 116 for example where the presence or absence of water is indicated for an user.

This measurement method allows for a contact free detection of the water level, therefore eliminating the need for a floating probe outfitted in the water tank 118. The method relies on the change of refractive index in the light path and gives binary results that might be displayed on a user panel.

Coming back to the overall representation of an exemplary beverage preparation device 100 in FIG. 1, the beverage preparation device 100 is assumed as comprising a water circulation system 500 that comprises all the technical solutions discussed above in connection with FIGS. 2 to 5.

Therefore, the system 100 comprises a water tank 118 connected to the water circuit 500 of the beverage preparation machine through the optimized rubber water tank connector 201 (indicated as area 200 in FIG. 1). Further, the beverage preparation device 100 comprises an integrated pump fixation and low pressure system. Further yet, the beverage preparation system 100 comprises tubing that is integrated with electrical connectors and a binary solution for measuring the water level in a water tank.

The following advantages are apparent upon use of the beverage preparation system of the present invention:
  several component parts present in a classical water circulation system of a beverage preparation machine can be eliminated without compromising the beverage preparation device's operation and quality of the resulting beverage, but leading to economies of parts, simpler structure, ease of fabrication and economy of cost for the water circulation system of the beverage preparation machine.

the retaining lips of the water tank and of the filter insert make any additional filter fixation means unnecessary. As a result, the number of stand alone parts of the water tank connector are decreased. As a direct consequence, the number of parts necessary for the assembly is reduced and this improvement results in a simplification of manufacturing and lower costs for the water tank and therefore for the overall water circulation system of device 100.

the manufacture of a the water tank with a water tank connector in accordance with the present invention, the manufacture is only one step, since the shape of the connector's surface includes an annular protrusion that is compressed against the facing surface of the tank's outlet, to seal off the connection between the tank and the machine's water circulation system.

The result of partially or total integration into one piece, according to the present invention of the low pressure water circuitry, and connectors into the pump base is the reduction in the number of stand alone parts integrated in the beverage preparation system and therefore resulting in the reduction of the overall number of parts. The consequence is the improvement of assembly facility for the beverage preparation device 100 and its cost reduction.

In addition, since the number of connectors is decreased, a better compression of the system is achieved, by eliminating the weak spots where leaks can occur. By integrating the pump support, the space occupied by the pump body is decreased for the same pump performance.

Although the present invention has been described with reference to preferred embodiments thereof, many modifications and alternations may be made by a person having ordinary skill in the art without departing from the scope of this invention which is defined by the appended claims.

LIST OF REFERENCE NUMBERS

A—light beam (FIG. 5*a*)
A'—light beam (FIG. 5*b*)
100—beverage preparation device
102—conduit inlet
104—a water pump
106—water heating means
108—extraction/brewing chamber
110—ingredient-containing capsule
112—beverage outlet
114—electric connector 114
116—user interface
118—water tank
120—electronic control circuitry
122—flow meter
124—machine housing
125—base of device
200—area of interface between a water tank 118 with the rest of the water circuitry system 500 of the beverage preparation device 100
201—water tank connector
202—outlet of water tank 118
204—water tank connector sealing lip
206—retaining lip
207—annular protrusion
208—a filter insert
300—area of the water circuitry system of the beverage preparation device
302—tubing/water conduit
303—conduit outlet
304—pump support
305'—intermediate outlet
305"—intermediate inlet
306—pump connector
307—foot member
308—stems
400—connector
403—connector counterpart
401—snap fit ring
402—electrical wiring
404—snap fit fitting
406—electrical plug
408—one plastic part
410—O-ring
500—water circulation system
502—optical light source
506—optical detector
600—area of the water tank

What is claimed is:

1. A beverage preparation device having a water circulation system that comprises:
   a housing,
   a water source having an outlet,
   a pump having a support member for holding and securing the pump in the device housing, and
   an integral water conduit having an inlet and outlet for guiding water from the water source to the pump, with the conduit outlet connected to the pump;
   wherein the water source outlet is connected to the water conduit inlet via an annular sealing member that forms an integral protruding portion of one of the conduit inlet or the source outlet; and
   wherein the pump support is integral with the water conduit and separate from the housing.

2. The device of claim 1, wherein the pump support is integral with the conduit outlet of the water conduit.

3. The device of claim 1, wherein the conduit outlet incorporates electrical circuitry connected to the pump.

4. The device of claim 3, wherein the conduit outlet or the electrical circuitry is connected to the pump by a snap fit connector.

5. The device of claim 1, wherein the water source is a water tank for containing water having a level in the tank that is measured via an optical water level detector.

6. The device of claim 1, wherein the integral conduit has an intermediate portion that is connected to a sensor comprising a flow meter, pressure sensor or temperature sensor.

7. The device of claim 6, wherein the intermediate portion of the conduit has an intermediate outlet and intermediate inlet for guiding water into and out from the sensor between the water source and the pump, with the outlet and intermediate inlet being integral with the conduit extending from the water source to the pump.

8. The device of claim 1, wherein the annular sealing member is integral with the water conduit inlet and compressed against the source outlet, or vice versa, to seal the connection between the water conduit and water source.

9. The device of claim 1, wherein the pump support has a pump connector integral with the conduit or conduit outlet for mechanically connecting the pump to the support; and a foot member integral with the pump connector for securing the support in the beverage preparation device, with the conduit outlet optionally extending through the pump connector to a water inlet of the pump.

10. The device of claim 1, wherein the water conduit incorporates electrical circuitry connected to the pump.

11. The device of claim 1, wherein the water source comprises a tank for containing water and for supplying water to a pump of the device; and an optical sensor for measuring a water level in the tank, with the optical sensor comprising: a light emitter for emitting to the water in the tank a light beam (A,A') that is deflectable by the water as a function of the water level; and a light detector for detecting the emitted light beam upon deflection, wherein the light emitter and light detector are arranged such that the emitted light beam (A,A') is deflectable onto the detector when the water level reaches a predetermined lower value in the tank.

12. The device of claim 11, wherein the light detector is located at a bottom part of the water tank, the light emitter and detector being arranged so that the emitted light beam (A') undergoes a succession of reflections and refractions and so that the detector receives a portion of the reflected light beam (A') when the water level in the water tank reaches the predetermined lower value, or vice versa.

13. A beverage preparation device having a water circulation system that comprises:
   a housing,
   a water source having an outlet,
   a pump having a support member for holding and securing the pump in the device housing, and
   an integral water conduit having an inlet and outlet for guiding water from the water source to the pump, with the conduit outlet connected to the pump and incorporating electrical circuitry therein, and, wherein the conduit outlet or the electrical circuitry is connected to the pump by a snap fit connector;
   wherein the water source outlet is connected to the water conduit inlet via an annular sealing member that forms an integral protruding portion of one of the conduit inlet or the source outlet; and
   wherein the pump support is integral with the water conduit and separate from the housing to form a compact arrangement that conserves space within the housing.

14. The device of claim 13, wherein the integral conduit has an intermediate portion that is connected to a sensor comprising a flow meter, pressure sensor or temperature sensor.

15. The device of claim 14, wherein the intermediate portion of the conduit has an intermediate outlet and intermediate inlet for guiding water into and out from the sensor between the water source and the pump, with the outlet and intermediate inlet being integral with the conduit extending from the water source to the pump.

16. The device of claim 13, wherein the annular sealing member is integral with the water conduit inlet and compressed against the source outlet, or vice versa, to seal the connection between the water conduit and water source.

17. The device of claim 13, wherein the pump support has a pump connector integral with the conduit or conduit outlet for mechanically connecting the pump to the support; and a foot member integral with the pump connector for securing the support in the beverage preparation device, with the conduit outlet optionally extending through the pump connector to a water inlet of the pump.

18. The device of claim 13 wherein the water source comprises a tank for containing water and for supplying water to a pump of the device; and an optical sensor for measuring a water level in the tank, with the optical sensor comprising: a light emitter for emitting to the water in the tank a light beam (A,A') that is deflectable by the water as a function of the water level; and a light detector for detecting the emitted light beam upon deflection, wherein the light emitter and light detector are arranged such that the emitted light beam (A,A') is deflectable onto the detector when the water level reaches a predetermined lower value in the tank.

19. The device of claim 18, wherein the light detector is located at a bottom part of the water tank, the light emitter and detector being arranged so that the emitted light beam (A') undergoes a succession of reflections and refractions and so that the detector receives a portion of the reflected light beam (A') when the water level in the water tank reaches the predetermined lower value, or vice versa.

* * * * *